United States Patent [19]
Chu et al.

[11] Patent Number: 5,807,915
[45] Date of Patent: Sep. 15, 1998

[54] POLYPHENYLENE OXIDE DELIVERY SYSTEM FOR ADHESIVE COMPOSITIONS

[75] Inventors: Wayne K. Chu, Tarrytown, N.Y.; Erwin R. Ruckel, Wilton, Conn.

[73] Assignee: Arizona Chemical Company, Panama City, Fla.

[21] Appl. No.: 803,873

[22] Filed: Feb. 24, 1997

Related U.S. Application Data

[63] Continuation of Ser. No. 535,903, Sep. 28, 1995, abandoned.

[51] Int. Cl.$^6$ .............................. C08L 45/00; C08L 71/12
[52] U.S. Cl. ......................... 524/270; 524/504; 524/505; 525/148
[58] Field of Search ................................. 524/270, 505, 524/504; 525/148

[56] References Cited

U.S. PATENT DOCUMENTS

| | | | |
|---|---|---|---|
| H1387 | 12/1994 | Hansen et al. ............................ | 525/92 |
| 3,257,357 | 6/1966 | Stamatoff ................................. | 260/47 |
| 3,257,358 | 6/1966 | Stamatoff ................................. | 260/47 |
| 3,306,874 | 2/1967 | Hay ......................................... | 260/47 |
| 3,306,875 | 2/1967 | Hay ......................................... | 260/47 |
| 3,361,851 | 1/1968 | Gowan ..................................... | 260/897 |
| 3,660,531 | 5/1972 | Lauchlan et al. ..................... | 260/876 B |
| 3,917,607 | 11/1975 | Crossland et al. ..................... | 524/487 |
| 4,104,323 | 8/1978 | Hansen ................................... | 260/829 |
| 4,141,876 | 2/1979 | Hansen ................................... | 260/33.6 |
| 4,166,055 | 8/1979 | Lee, Jr. ................................... | 260/511 |
| 4,189,411 | 2/1980 | Haaf ....................................... | 260/27 R |
| 4,314,926 | 2/1982 | Allison, III ..................... | 260/33.6 AQ |
| 4,360,568 | 11/1982 | Allison, III ............................. | 428/411 |
| 4,454,284 | 6/1984 | Ueno et al. ............................. | 524/427 |
| 4,495,333 | 1/1985 | White ..................................... | 525/150 |
| 4,728,461 | 3/1988 | Fujii et al. .............................. | 252/511 |
| 4,849,486 | 7/1989 | Tsuchiya et al. ....................... | 525/152 |
| 4,867,881 | 9/1989 | Kinzer ..................................... | 210/490 |
| 4,959,412 | 9/1990 | Arter et al. ............................. | 525/98 |
| 4,994,508 | 2/1991 | Shiraki et al. .......................... | 524/14 |
| 5,084,516 | 1/1992 | Tsuchiya et al. ....................... | 525/149 |
| 5,326,813 | 7/1994 | Okada et al. .......................... | 524/508 |
| 5,376,724 | 12/1994 | Bailly et al. ........................... | 525/132 |
| 5,418,275 | 5/1995 | Okada et al. .......................... | 524/504 |
| 5,444,126 | 8/1995 | Okada et al. .......................... | 525/391 |

FOREIGN PATENT DOCUMENTS

| | | | |
|---|---|---|---|
| 6-57008 | 3/1994 | Japan ................................. | C08J 3/20 |
| 90/14396 | 11/1990 | WIPO ............................. | C09J 153/02 |
| 90/14397 | 11/1990 | WIPO ............................. | C09J 153/02 |

OTHER PUBLICATIONS

JP–47003136 (Abstract only) (1972).
JP–59–126460 (Abstract only) (1984).
JP–58–129051 (Abstract only) (1987).
JP–58–129050 (Abstract only) (1987).

*Primary Examiner*—Vasu Jagannathan
*Assistant Examiner*—Olga Asinovsky
*Attorney, Agent, or Firm*—Luedeka, Neely & Graham, P.C.

[57] ABSTRACT

The specification discloses a polyphenylene oxide delivery system for use in preparing an A-B-A block copolymer adhesive formulation having an increased service temperature. The delivery system comprises a preblend of polyphenylene oxide (PPO) resin having a $T_g$ within the range of from about 150° to about 210° C. and a B-block compatible resin. The PPO/B-block resin preblend enables introduction of more PPO into the composition thereby increasing the service temperature of the adhesive formulation.

6 Claims, No Drawings

POLYPHENYLENE OXIDE DELIVERY SYSTEM FOR ADHESIVE COMPOSITIONS

This application is a continuation of application Ser. No. 08/535,903, filed Sep. 28, 1995, now abandoned.

The present invention relates to a polyphenylene oxide delivery system for use in increasing the upper service temperature of an adhesive composition.

BACKGROUND

Hot melt and/or pressure sensitive adhesives have gained wide acceptance because they generally do not require the presence of solvents which tend to evaporate from the adhesives resulting in environmental problems.

Hot melt technology allows the adhesive components to be mixed by high shear mixing or melt mixing techniques in commercially available equipment. Once mixed, the adhesives may be applied to a substrate in molten form. Since no solvent is used in the adhesive formulation, there is no solvent to evaporate, hence extended drying times are not required.

While hot melt adhesives generally reduce the pollution problems due to their lack of the need for a solvent, they do suffer some drawbacks. One drawback is that the processing temperatures required to form the adhesive compositions often adversely affect the adhesive's properties. Processing temperatures in excess of about 180° C. may result in degradation of the adhesive composition.

Many hot melt and/or pressure sensitive adhesives contain conjugated diene/monovinyl aromatic copolymers (A-B-A) block copolymers, e.g., styrene-diene block copolymers. Because of the relatively low upper service temperature of the A-B-A block copolymers, components such as polyphenylene ether (also known as polyphenylene oxide) have been added to the adhesive formulations in order to increase the service temperature and holding power of adhesives. However, product degradation has been encountered when attempting to blend the polyphenylene ether component with the A-B-A block copolymers, particularly when the A-B-A block copolymer is a styrene-isoprene-styrene copolymer.

One approach to incorporating polyphenylene ether into an adhesive composition is disclosed in U.S. Pat. Nos. 4,104,323 and 4,141,876 to Hansen. In his approach, Hansen discloses the use of a pre-blend of polyphenylene ether and an A-block compatible resin. According to Hansen, the A-block compatible resins may be selected from the group consisting of coumaroneindene resins, vinyl toluene-α-methylstyrene copolymers and mixtures thereof.

U.S. Pat. No. 4,314,926 to Allison, III also discloses the use of a mixture of polyphenylene ether and an A-block compatible resin, e.g., poly(alpha-methylstyrene), in order to increase the holding power of a hot melt adhesive formulation.

While a blend of polyphenylene ether and A-block compatible resins may be used for some applications, it has been found that it is extremely difficult to incorporate large amounts of polyphenylene ether into the adhesive composition without excessive oxidative degradation of the A-B-A block copolymers due to the high melt temperatures required. Furthermore, the A-block compatible resins may compromise the integrity of the polyphenylene ether/styrene domain because the A-block compatible resins have relatively low glass transition temperatures ($T_g$).

WO 90/14397 to Audett discloses an adhesive mixture prepared by blending an A-B-A block copolymer, a tackifying resin compatible with the elastomeric midblock of the copolymer and a polyphenylene oxide polymer having a $T_g$ range of 100° to 165° C., preferably 140° to 163° C. According to Audett, a significant advantage is obtained by using PPO having a lower $T_g$ than the PPO disclosed in U.S. Pat. Nos. 4,104,323 and 4,141,876 since higher $T_g$ PPO resins cannot be hot melt processed unless they are preblended with low molecular weight aromatic resins such as polystyrene.

It is therefore an object of the invention to provide an improved hot melt/pressure sensitive adhesive formulation.

Another object of the invention is to provide an adhesive formulation having significantly elevated shear adhesion failure temperatures (SAFT) and high-temperature peel strengths.

A further object of the invention is to provide compositions which will permit melt blending of a polyphenylene oxide resin with an A-B-A block copolymer.

Still another object of the invention is to provide a method for increasing the holding power of hot melt and pressure sensitive adhesives.

Yet another object of the invention is to provide a method for significantly elevating the shear adhesion failure temperature (SAFT) and high-temperature peel strength of an adhesive formulation.

With regard to the foregoing and other objects, the present invention provides a polyphenylene oxide delivery system for increasing the upper service temperature of an A-B-A block copolymer adhesive composition which comprises a blend containing from about 5 to about 45 parts by weight of a polyphenylene oxide (PPO) resin and from about 1 to about 450 parts of a B-block compatible resin. The PPO resin of the blend preferably has a glass transition temperature ($T_g$) within the range of from about 150° to about 210° C. and a number average molecular weight ranging from about 2,000 to about 6,000 Daltons.

In order to increase the service temperature of an A-B-A block copolymer adhesive composition by using a PPO resin, it is important that the PPO resin be associated with the A-blocks of the copolymer. According to conventional wisdom, A-block compatible resins have been used for associating the PPO resin with the A-block components of the copolymer. However, it has now been found that a blend of PPO resin having a relatively high $T_g$ with a B-block compatible resin may be used to incorporate the PPO resin into an A-B-A block copolymer adhesive formulation using much lower processing temperatures. Furthermore, since more PPO resin having a high $T_g$ may be incorporated into the adhesive composition, the adhesive will exhibit significantly higher shear adhesion failure temperatures (SAFT) and higher peel strengths than adhesive compositions prepared by blending PPO resins with A-block compatible resins or by using PPO resins having lower glass transition temperatures.

According to another aspect of the invention, a method is provided for making an A-B-A block copolymer adhesive composition. The method comprises first preblending, at an elevated temperature, from about 5 to about 45 parts by weight PPO resin having a $T_g$ within the range of from about 150° to about 210° C. with from about 1 to about 450 parts by weight of a B-block compatible resin in order to provide a PPO/B-block resin blend. Next the resin blend is mixed with about 100 parts by weight of an A-B-A block copolymer at a temperature below about 180° C. to form the adhesive composition. Adhesive compositions made by the foregoing method exhibit shear adhesion failure temperatures within the range of from about 185° to about 222° C. and a 180° peel strength ranging from about 4 to about 7 pounds per inch and may be used in hot melt or pressure sensitive formulations.

Adhesive compositions improved by use of the delivery system of the invention have an A-B-A block copolymer which is comprised of at least two monoalkenyl arene polymer end blocks (the "A-blocks") and at least one elastomeric conjugated diene polymer midblock (the "B-block" or "B-midblock"). In the A-B-A block copolymer, the B-block confers the adhesive properties to the composition. The number of blocks of the copolymer is not of special importance and the macromolecular configuration of the copolymer may be linear or radial depending upon the method by which the block copolymer is formed.

The monoalkenyl arene monomers used in the A-blocks of the copolymer may contain 8 to 16 carbon atoms and include, but are not limited to, styrene, 3-methylstyrene, 4-n-propylstyrene, 4-p-tolylstyrene, 1-vinylnaphthalene, 2-vinylnaphthalene, tert-butyl styrene and other ring alkylated styrenes as well as mixtures of two or more of the foregoing. Typically, the A-block of the copolymer, in the absence of PPO, will have a $T_g$ of about 95° to about 100° C. and a molecular weight of about 10,000 to about 11,000 Daltons. Thus, the upper service temperature of the copolymer is about 95° to about 100° C. without the use of PPO to increase the service temperature.

The conjugated diene monomers used in the B midblocks of the copolymer may contain 4 to 8 carbon atoms and may be hydrogenated or non-hydrogenated. Examples of suitable conjugated diene monomers include, but are not limited to, 1,3-butadiene, isoprene, 2,3-dimethyl-1,3-butadiene, piperylene, 3-butyl-1,3-octadiene, 1-phenyl-1,3-butadiene and mixtures thereof. Preferred A-B-A block copolymers include polystyrene-polyisoprene-polystyrene, polystyrene-polybutadiene-polystyrene and poly($\alpha$-methylstyrene)-polyisoprene-poly($\alpha$-methylstyrene). A typical radial polymer may include one in which the diene block has three or more branches with the tip of each branch being connected to a polystyrene block.

The polyphenylene oxide delivery system used to increase the service temperature of the A-B-A block copolymer according to the invention comprises a blend containing PPO resin and a B-block compatible resin. A preferred PPO resin component of the blend has the formula:

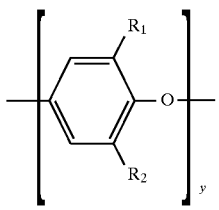

wherein $R_1$ is a monovalent substituent selected from the group consisting of hydrogen, hydrocarbon radicals free of tertiary $\alpha$-carbon atoms, halohydrocarbon radicals having at least two carbon atoms between the halogen atom and the phenol nucleus and being free of tertiary $\alpha$-carbon atoms, hydrocarbonoxy radicals free of tertiary $\alpha$-carbon atoms, and halohydrocarbonoxy radicals having at least two carbon atoms between the halogen atom and the phenol nucleus and being free of tertiary $\alpha$-carbon atoms; $R_2$ is the same as $R_1$ and in addition a halogen atom; and y is an integer greater than 10 and less than about 65. Methods for preparing such PPO resins are well known and are disclosed, for example, in U.S. Pat. Nos. 3,257,357; 3,257,358; 3,306,874 and 3,306,875, all of which are incorporated herein by reference as if fully set forth.

Typical examples of monovalent hydrocarbon radicals $R_1$ and $R_2$ are alkyl, including cycloalkyl, e.g., methyl, ethyl, propyl, isopropyl, butyl, secondary butyl, isobutyl, cyclobutyl, amyl, cyclopentyl, hexyl, cyclohexyl, methylcyclohexyl, ethylcyclohexyl, octyl, decyl, octadecyl, and the like; alkenyl, including cycloalkenyl, e.g., vinyl, allyl, butenyl, cyclobutenyl, isopentyl, cyclopentenyl, linolyl, and the like; alkynyl, e.g., propargyl; aryl, including alkaryl, e.g., phenyl, tolyl, ethylphenyl, xylyl, naphthyl, methylnaphthyl and the like; aralkyl, e.g., benzyl, phenylethyl, phenylpropyl, tolylethyl and the like. The monovalent halohydrocarbon radicals may be the same as the hydrocarbon radicals, as outlined above, except methyl and $\alpha$-haloalkyl radicals, wherein one or more of the hydrogen atoms are replaced by halogen to produce halohydrocarbon radicals having at least two carbon atoms between the halogen and the free valence. Examples of monovalent halohydrocarbon radicals include 2-chloroethyl, 2-bromoethyl, 2-fluoroethyl, 2,2-dichloroethyl, 2- and 3-bromopropyl, 2,2-difluoro-3-iodopropyl, 2-, 3- and 4-bromobutyl, 2-, 3-, 4- and 5-fluoroamyl, 2-chlorovinyl, 2- and 3-bromoallyl, 2- and 3-fluoropropargyl, mono-, di-, tri-, tetra- and penta-chlorophenyl, mono-, di-, tri- and tetra-bromotolyl, chloroethylphenyl, ethylchlorophenyl, fluoroxylyl, chloronaphthyl, bromo-benzyl, iodophenylethyl, phenylchloroethyl, bromotolyl-ethyl and the like.

Examples of the monovalent hydrocarbonoxy radicals include methoxy, ethoxy, propoxy, isopropoxy, butoxy, secondary butoxy, tertiary butoxy, amoxy, hexoxy, octoxy, decoxy, vinoxy, alloxy, butenoxy, propargoxy, phenyloxy, toloxy, ethylphenoxy, naphthoxy, methylnaphthoxy, benzoxy, phenylethoxy, phenylpropoxy, tolylethoxy and the like. The monovalent halohydroxycarbonoxy radicals may be the same as the above oxyhydrocarbon radicals except methoxy and $\alpha$-haloalkoxy radicals, where one or more of the hydrogens are replaced by a halogen, i.e., fluorine, chlorine, bromine, or iodine, to produce halohydrocarbonoxy radicals having at least two carbon atoms between the halogen and the free valence. Examples of halohydroxycarbonoxy radicals include 2-chloroethoxy, 2-bromoethoxy, 2-fluoroethoxy, 2,2-dichloroethoxy, 2- and 3-bromopropoxy, 2,2-difluoro-3-chloropropoxy, 2-, 3- and 4-iodobutoxy, 2-, 3-, 4- and 5-fluoroamoxy, 2-chlorovinoxy, 2- and 3-bromoalloxy, 2- and 3-fluoropropargoxy, mono-, di-, tri-, tetra- and pentachlorophenoxy, mono-, di-, tri- and tetrabromotoloxy, chloroethylphenoxy, ethylchlorophenoxy, iodoxyloxy, chloronaphthoxy, bromobenzoxy, chlorophenylethoxy, phenylchloroethoxy, bromotolylethoxy and the like.

The amount of PPO resin incorporated into the adhesive formulation may range from about 33 to about 120 wt. % of the polystyrene (PS) end-block weight for a styrene-isoprene-styrene (SIS) copolymer which translates to about 6 to about 30 percent by weight of the total elastomer weight in the final formulation. Below about 33 wt. % PPO (wt./wt. on PS) there may still be some improvement in adhesive properties, but above 120 wt. % (wt./wt. on PS) the mobility of the polyisoprene rubbery phase may be restricted thus leading to a decrease in desirable rheological properties such as tack. For polybutadiene rubbery phases, the maximum useful amount of PPO may be as low as 50 wt. % of the PS end block weight.

Another component of the blend is a B-block compatible resin. Suitable B-block compatible resins may be selected from $C_5$–$C_9$ resins, dicyclopentadiene, aromatic modified terpenes, terpene phenols, alkyl phenols, rosin phenols, rosin esters, polymerized rosin and mixtures of two or more of the foregoing preferably having a $T_g$ within the range of from about 0° to about 100° C., more preferably within the range of from about 40° to about 90° and most preferably within the range of from about 55° to about 85° C. These B-block compatible resins would therefore exhibit ring and ball softening points within the range of from about 25° C. to about 135°, preferably within the range of from about 85° C. to about 115° C.

With regard to the amount of PPO resin in the blend, the weight ratio of PPO resin to B-block compatible resin may generally be within the range of from about 1:10 to about 5:1, preferably within the range of from about 1:7 to about 1:1. More PPO resin in the blend than about 5:1 is not desired due to the higher temperatures and longer processing times which may be required to adequately form the blend. Likewise, very high quantities of B-block compatible resin in the blend, e.g., more than about 10 parts per part of PPO resin may have a deleterious effect on the holding power and high temperature strength of the adhesive composition and thus are preferably avoided.

Blends of the PPO resin and B-block compatible resin may be made by first heating the B-block compatible resin to its normal process temperature of about 190° to about 220° C. under an inert atmosphere in an agitated mixing vessel. Inert atmospheres which may be used include nitrogen, argon and the like. Once the B-block compatible resin has reached process temperature, small beads or flakes of the PPO resin are slowly added to the molten B-block resin with agitation until an essentially homogeneous blend of PPO/B-block resin is formed. The resulting essentially homogeneous blend of PPO/B-block compatible resin has a lower viscosity and softening temperature than pure PPO resin and, at room temperature, the blend is substantially transparent or semi-translucent.

While not preferred, the B-block compatible resin may also be added to molten PPO. The addition of B-block compatible resin to molten PPO may be aided by the use of a solvent, however, it is preferred to make the blends of PPO and the B-block compatible resin in the absence of solvent.

In addition to the adhesion enhancing blend of polyphenylene oxide/B-block compatible resin, adhesive compositions of the invention also preferably contain at least one tackifier resin. Typical tackifier resins which may be used include polyolefins, polymerized mixed olefins, mixed esters of polymerized rosin, glycerol esters of rosin, penterythritol ester of rosin, polydipentene, aromatic-modified polyterpenes, aromatic-modified $C_5$ copolymers, aromatic resins and mixtures thereof. The tackifier resin may be added to the PPO/B-block compatible resin blend during blending, or it may be mixed with the A-B-A block copolymer before, during or after mixing the PPO/B-block compatible blend with the copolymer. The weight ratio of tackifier resin to A-B-A block copolymer in the adhesive composition ranges from about 1:5 to about 10:1, preferably from about 1:2 to about 5:1 and most preferably from about 1:1 to about 1:1 to about 1.5:1.

Another useful ingredient of adhesive compositions according to the invention may be a stabilizer, depending on the particular application. Any stabilizer compound known to impart antioxidant characteristics may be used. Accordingly, the stabilizer compound may be selected from materials such as hindered phenols, amines, metal dialkyldithiocarbamates, thioesters and the like.

Adhesives formulations also often contain mineral oils or extender oils to improve the adhesive properties of the formulations. Suitable extender oils include the naphthenic extender oils and the paraffinic oils having a substantially linear structure.

The following nonlimiting examples are provided to further illustrate various aspects of the invention.

EXAMPLE 1

Three blends were prepared by melt blending a B-block compatible resin (ZONATAC 105 having a ring and ball softening point of 103° C. ($T_g$ about 55° C.) commercially available from Arizona Chemical Company of Panama City, Fla.), an A-block compatible resin (KRYSTALEX 3100, a mostly α-methyl-styrene resin having a ring and ball softening point of 100° C. commercially available from Hercules Incorporated of Wilmington, Del.) and another A-block compatible resin consisting of a low molecular weight polystyrene having a ring and ball softening point of 102° C. with PPO 940001 resin, available from the GE Plastics Company of Selkirk, N.Y., at a weight ratio of 1:1 and at a temperature of 220° C. These PPO/resin blends were compared against ENDEX 155 resin, a commercially available A-block reinforcing resin from Hercules, Incorporated. The three PPO/resin blends imparted neat complex viscosities comparable to ENDEX 155 resin between 160° and 180° C., which is a typical processing temperature range for hot melt adhesives.

The PPO/resin blends were then formulated into a permanent label adhesive formulations as shown in Tables 1–3 so each one had the same weight percent of A-block compatible or B-block compatible resins. Each adhesive composition was melt coated onto MYLAR film and cooled so that the total thickness of coating was 1 mil. The adhesives were then analyzed to determine their SAFT (° F.), shear (min.), 180° Peel (lbs/inch), polyken probe tack (grams) and endblock $T_g$ (by RDS II ° C.).

TABLE 1

| Component (parts by weight) | Sample #1 | Sample #2 | Sample #3 | Sample #4 | Sample #5 | Sample #6 | Sample #7 | Sample #8 |
|---|---|---|---|---|---|---|---|---|
| KRATON 1107[1] | 100 | 100 | 100 | 100 | 100 | 100 | 100 | 100 |
| SHELLFLEX 371[2] | 40 | 40 | 40 | 40 | 40 | 40 | 40 | 40 |
| IRGANOX 1010[3] | 2 | 2 | 2 | 2 | 1 | 1 | 1 | 1 |
| WINGTACK 95[4] | 126 | 140 | 140 | 140 | 126 | 140 | 140 | 140 |
| PPO 940001[5] | 14 | 7 | 7 | — | — | — | — | — |
| PPO P940203B[6] B-block Resin | — | — | — | — | 14 | 14 | — | — |
| ZONATAC 105[7] | 14 | — | — | — | 14 | — | — | — |

TABLE 1-continued

| Component (parts by weight) | Sample #1 | Sample #2 | Sample #3 | Sample #4 | Sample #5 | Sample #6 | Sample #7 | Sample #8 |
|---|---|---|---|---|---|---|---|---|
| A-block Resins | | | | | | | | |
| polystyrene (1818-2)[8] | — | 7 | — | — | — | — | — | — |
| KRYSTALEX 3100[9] | — | — | 7 | — | — | — | — | — |
| ENDEX 155[10] | — | — | — | 14 | — | — | — | 14 |
| Adhesive Properties | | | | | | | | |
| SAFT (°F.)[11] | 219 | 203 | 207 | 187 | 216 | 220 | 176 | 189 |
| Shear (min.) | 538 | 587 | 253 | 545 | 2344 | 2982 | 153 | 1820 |
| 180° Peel (lbs/inch)[12] | 4.9 | 5.0 | 4.8 | 5.5 | 5.3 | 6.1 | 5.0 | 3.6 |
| Polyken Probe tack[13] (grams) | 1062 | 1139 | 1120 | 1312 | 1444 | 1342 | 1333 | 1414 |
| Endblock $T_g$ (by RDS II °C.) | — | — | — | — | 158 | 159 | 122 | 131 |

[1]KRATON 1107 - styrene-isoprene-styrene copolymer having block molecular weights of about 13,000-160,000-13,000.
[2]SHELLFLEX 371 - a naphthenic extender oil.
[3]IRGANOX 1010 - a high molecular weight hindered phenol antioxidant.
[4]WINGTACK 95 - a diene-olefin tackifier resin.
[5]PPO 940001 - polyphenylene oxide having a $T_g$ of 158° C. and an $M_n$ of 1647 by vapor phase gas chromatographic analysis.
[6]PPO P940203B - polyphenylene oxide having a $T_g$ of 157° C. and an $M_n$ of 1580 by vapor phase gas chromatographic analysis.
[7]ZONATAC 105 - B-block compatible resin prepared by the cationic polymerization of limonene and styrene having a ring and ball softening point of about 105° C.
[8]polystyrene (1818-2) - low molecular weight polystyrene $M_n$ = 1029, $M_w$ = 3112.
[9]KRYSTALEX 3100 - a mostly α-methyl styrene resin.
[10]ENDEX 155 - a commercial A-block reinforcing resin.
[11]SAFT - Shear Adhesion Failure Test (ASTM D-4498-85) - In the SAFT test, a 1 inch by 1 inch overlap of MYLAR coated adhesive tape to a stainless steel substrate is made using a 4.5 pound roller. A 1 kg weight is then hung from the tape and the assembly is placed in an oven. The temperature of the oven is increased at 40° F. per hour and the temperature at which the weight dropped is recorded as the SAFT.
[12]180° Peel (ASTM D-903-93) - The 180° peel test involves placing a length of tape on a stainless steel plate and laminating it with a 4.5 pound roller. The force (lbs/inch) required to peel the tape at 180° angle on an Instron instrument is recorded.
[13]Polyken Probe Tack (ASTM D-2979-88) - In the polyken probe tack test, a steel probe contacts the adhesive tape with a specified force for a 1 second dwell time. The force required to break the bond between the adhesive and the stainless steel probe is measured in grams.

TABLE 2

| Component (parts by weight) | Sample #9 | Sample #10 | Sample #11 | Sample #12 | Sample #13 |
|---|---|---|---|---|---|
| SOL T 168[14] | 100 | 100 | 100 | 100 | 100 |
| SHELLFLEX 371 | 50 | 50 | 50 | 50 | 50 |
| IRGANOX 1010 | 5 | 5 | 5 | 5 | 5 |
| PPO 940204A[15] | — | — | — | 22 | — |
| PPO P940203B | — | 43 | 22 | — | 22 |
| B-block Resin | | | | | |
| ZONATAC 105 | 150 | 150 | 150 | 150 | — |
| BEVELITE 62-107[16] | — | — | — | — | 150 |
| Adhesive Properties | | | | | |
| SAFT (°F.) | 145 | — | 189 | — | — |
| Shear (min.) | 9932 | — | 11,000+ | — | — |
| 180° Peel (lbs/inch) | 4.1 | — | 4.5 | — | — |
| Polyken Probe tack (grams) | 1069 | 12 | 663 | 647 | 236 |
| Thickness (mils) | 1.1 | 1.5 | 1.4 | 1.4 | 1.4 |

[14]SOL T 168 - styrene-isoprene-styrene block copolymer having 25 weight % styrene.
[15]PPO P940203A - polyphenylene oxide having a $T_g$ of 175° C. and an $M_n$ of 2105 by vapor phase gas chromatographic analysis.
[16]BEVELITE 62-107 - rosin ester of pentaerythritol.

TABLE 3

| Component (parts by weight) | Sample #14 | Sample #15 | Sample #16 | Sample #17 | Sample #18 | Sample #19 | Sample #20 | Sample #21 |
|---|---|---|---|---|---|---|---|---|
| styrene-isoprene-styrene copolymer | 100 | 100 | 100 | 100 | 100 | — | — | — |
| styrene-butadiene-styrene copolymer | — | — | — | — | — | 100 | 100 | 100 |
| WINGTACK 95 | 100 | 100 | 100 | 90 | 43 | — | — | — |
| ARKON P-90[17] | — | — | — | — | — | — | — | 128 |
| IRGANOX 1010 | 1 | 1 | 1 | 1 | 1 | 2 | 2 | 2 |
| PPO 940001 | — | — | — | 10 | 10 | — | 21.5 | 21.5 |
| B-block Resin | | | | | | | | |
| ZONATAC 105L | — | — | — | 10 | 57 | 150 | 150 | 21.5 |

TABLE 3-continued

| Component (parts by weight) | Sample #14 | Sample #15 | Sample #16 | Sample #17 | Sample #18 | Sample #19 | Sample #20 | Sample #21 |
|---|---|---|---|---|---|---|---|---|
| A-block Resins | | | | | | | | |
| ENDEX 155 | — | 10 | — | — | — | — | — | — |
| ENDEX 160[18] | — | — | 10 | — | — | — | — | — |
| Adhesive Properties | | | | | | | | |
| SAFT (°F.) | 177 | 189 | 190 | 222 | 208 | 146 | 185 | 188 |
| Shear (min.) | 180 | 316 | 316 | 597 | 499 | 3269 | 10,000+ | 10,000+ |
| 180° Peel (lbs/inch) | 5.6 | 5.5 | 5.5 | 5.1 | 4.0 | 6.4 | 5.3 | 4.9 |
| Polyken Probe tack (grams) | 1148 | 1477 | 1291 | 1280 | 1124 | 1227 | 625 | 1103 |
| Thickness (mils) | 1 | 1 | 1 | 1 | 1 | 1 | 1 | 1 |

[17]ARKON P-90 - a hydrogenated cyclic hydrocarbon resin.
[18]ENDEX 160 - a commercial A-block reinforcing resin.

In the foregoing Tables, Samples 1, 5, 10, 11, 12, 13, 17–18, and 20–21 represent compositions of the invention containing a blend of PPO and B-block compatible resin. Samples 4, 8, 15 and 16 contain only a commercial A-block reinforcing resin. Samples 2 and 3 represent prior art adhesive compositions containing a PPO/A-block compatible resin blend.

As illustrated by the foregoing example, PPO/B-block compatible blends have at least two advantages over PPO/A-block compatible blends. The PPO/B-block compatible blends enable a higher level of PPO to be incorporated into the adhesive composition without significantly compromising the integrity of the PPO-reinforced polystyrene endblocks, while producing adhesive blends with similar softening points. In comparison, since the A-block compatible resins are totally miscible with the PPO-reinforced polystyrene endblocks (A-blocks), the enblock's average softening point, as represented by the SAFT value, is reduced. Adhesive formulations of the invention also exhibit little or no decrease in tack and have equivalent or greater peel strength as compared to adhesive formulations prepared using A-block compatible resins.

Having described and illustrated the invention and preferred embodiments thereof, it will be recognized by those of ordinary skill that variations of the invention are within the spirit and scope of the appended claims.

What is claimed is:

1. A composition for improving the thermal stability of adhesives containing an A-B-A block copolymer having styrenic A-blocks and an elastomeric conjugated diene B-block, the composition consisting essentially of a mixture of polyphenylene oxide (PPO) resin having a number average molecular weight ranging from about 2,000 to about 6,000 Daltons and a glass transition temperature ($T_g$) within the range of from about 150° to about 210° C. and a B-block compatible resin, wherein the mixture has a weight ratio of PPO resin to B-block compatible resin of from about 1:10 to about 5:1.

2. The composition of claim 1 wherein the PPO resin is of the formula

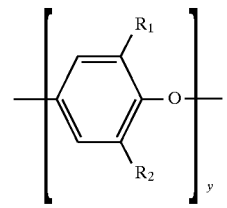

wherein $R_1$ is a monovalent substituent selected from the group consisting of hydrogen, hydrocarbon radicals free of tertiary α-carbon atoms, halohydrocarbon radicals having at least two carbon atoms between the halogen atom and the phenol nucleus and being free of tertiary α-carbon atoms, hydrocarbonoxy radicals free of tertiary α-carbon atoms, and halohydrocarbonoxy radicals having at least two carbon atoms between the halogen atom and the phenol nucleus and being free of tertiary α-carbon atoms; $R_2$ is the same as $R_1$ and in addition a halogen atom; and y is an integer greater than 20 and less than about 65.

3. The composition of claim 1 wherein the B-block compatible resin is selected from the group consisting of aromatic modified terpenes, terpene phenols, rosin esters, polymerized rosin, C-5/C-9-resins, dicyclopentadiene and mixtures thereof having a glass transition temperature ($T_g$) within the range of from about 0° to about 100° C.

4. A composition for improving the thermal stability of adhesives containing an A-B-A block copolymer having styrenic A-blocks and an elastomeric conjugated diene B-block, the composition consisting essentially of a mixture of polyphenylene oxide (PPO) resin having a number average molecular weight ranging from about 2,000 to about 6,000 Daltons and a glass transition temperature ($T_g$) within the range of from about 150° to about 210° C. and a B-block compatible resin selected from the group consisting of aromatic modified terpenes, terpene phenols, rosin esters, polymerized rosin, dicyclopentadiene and mixtures thereof, wherein the mixture has a weight ratio of PPO resin to B-block compatible resin of from about 1:10 to about 5:1.

5. The composition of claim 4 wherein the B-block compatible resin has a glass transition temperature ($T_g$) within the range of from about 0° to about 100° C.

6. The composition of claim 4 wherein the PPO resin is of the formula

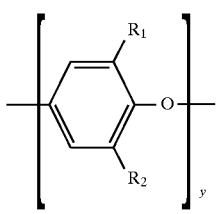

wherein $R_1$ is a monovalent substituent selected from the group consisting of hydrogen, hydrocarbon radicals fee of tertiary α-carbon atoms, halohydrocarbon radicals having at least two carbon atoms between the halogen atom and the phenol nucleus and being free of tertiary α-carbon atoms, hydrocarbonoxy radicals free of tertiary α-carbon atoms, and halohydrocarbonoxy radicals having at least two carbon atoms between the halogen atom and the phenol nucleus and being free of tertiary α-carbon atoms; $R_2$ is the same as $R_1$ and in addition a halogen atom; and y is an integer greater than 20 and less than about 65.

* * * * *